United States Patent [19]
Wood

[11] 4,209,537
[45] Jun. 24, 1980

[54] METHOD FOR EXPANDING PARTICULATE MATERIAL

[75] Inventor: Michael J. Wood, Westminster, Calif.

[73] Assignee: J. P. Burroughs & Son, Inc., Saginaw, Mich.

[21] Appl. No.: 867,001

[22] Filed: Jan. 5, 1978

Related U.S. Application Data

[60] Continuation of Ser. No. 712,691, Aug. 9, 1976, abandoned, which is a division of Ser. No. 472,977, May 24, 1974, Pat. No. 4,046,066.

[51] Int. Cl.² ............................................. A23K 1/14
[52] U.S. Cl. .................................. 426/233; 99/323.4; 426/447; 426/807
[58] Field of Search ............... 426/447, 449, 445, 448, 426/389, 233, 231, 623, 635, 807, 416; 99/323.4

[56] References Cited

U.S. PATENT DOCUMENTS

| | | | |
|---|---|---|---|
| 3,667,961 | 6/1972 | Algeo | 426/447 |
| 3,730,729 | 5/1973 | Strommer | 99/323.4 |

Primary Examiner—Kenneth M. Schor
Attorney, Agent, or Firm—Roger W. Herrell

[57] ABSTRACT

A continuous flow expander and method for expanding particulate material, more specifically for grain or cattle fodder, is provided whereby material to be expanded is transported in a substantially continuous manner through a pressurized region wherein it is heated, steamed and pressurized by a counterflow of dry steam created from available city water by a recirculating steam boiler. The material is then ejected by another flow of dry steam created from available water into a lower pressure region for expansion. Enthalpy in the ejection region is automatically maintained within a predetermined range, for grain or cattle fodder from 450 to 750 BTU per pound of moisture being ejected, regardless of the moisture content of the material, by varying steam boiler output and, if necessary, material flow rate. An expanded product requiring no further drying prior to use or storage is thereby provided with minimum energy use.

10 Claims, 10 Drawing Figures

METHOD FOR EXPANDING PARTICULATE MATERIAL

This application is a continuation of application Ser. No. 712,691 now abandoned, filed Aug. 9, 1976, which is a division of Ser. No. 472,977 filed May 24, 1974 now U.S. Pat. No. 4,046,066, granted Sept. 6, 1977.

BACKGROUND OF THE INVENTION

1. Field of the Invention

The invention relates generally to the field of expansion of particulate material capable of expansion by rapid internal decompression without substantial disintegration. More particularly, it relates to expansion of grain or cattle fodder, wherein grain or fodder is heated, steamed and pressurized and is then ejected into a lower pressure region where it rapidly decompresses into a much expanded form, whereby physical and chemical properties are beneficially altered.

2. Description of Prior Art

Various processes and apparatus have been developed over the past few decades for modifying or converting cereal grain into a form more readily consumable by humans, typically into some form of breakfast food. These include processes for converting cereal grain into a flake form, like corn flakes, by steaming and then rolling or flaking it, or into a puffed form, like puffed wheat, by steam pressurizing the grain and then ejecting it into a lower pressure region where it explosively decompresses into a much expanded form (for example, U.S. Pat. Nos. 2,622,985; 2,698,799 and 2,838,401 for puffing cereal grains). Still other processes employ pressure cooking to partially or fully cook starchy grains such as rice (for example, U.S. Pat. Nos. 2,525,137; 2,758,031; 3,085,011 and 3,085,013).

More recently, attempts have been made to adapt such processes to treating fodder material for cattle (the term cattle as used herein also includes other types of livestock and the term fodder as used herein includes various types of grain). The principal objective is to reduce feed costs, particularly at large feed lots, by creating an altered or modified fodder from which cattle can extract more nourishment. It appears this can be accomplished by irreversibly breaking down the large molecules of relatively hard to digest starch in the fodder into smaller molecules of more easily digested dextrin.

Initially the fodder treatments involved either pressure cooking the fodder or steaming and then rolling or flaking it. However, the maximum benefit sought was not achieved because the conversion of starch into dextrin by these processes is largely reversible. As a consequence, at least some of the dextrin reconverts to starch before the animal's digestive process begins.

In 1972, Algeo (U.S. Pat. No. 3,667,961) described a batch process for irreversibly breaking down the starch in fodder materials into dextrin. This process, similar to those used for puffing cereal grains, included pressurizing the fodder in a steam atmosphere at moderately high temperatures for a short period of time before ejecting it into the atmosphere where the pressurized particles explosively depressurized into a much expanded form. In theory, the steaming softens the fodder particles and allows them to become internally pressurized, and the subsequent explosive depressurization physically ruptures chemical bonds in the starch molecules, thereby irreversibly breaking down the starch molecules into dextrin molecules. Algeo described several side benefits including (1) increased porosity of the expanded fodder which allows easy penetration of the livestock's digestive juices, (2) thermal decomposition into harmless form of most chemical pesticides which may have been used on the fodder, and (3) destruction of any weed seed in the fodder, thereby providing for a weed-free manure.

This fodder expansion process appears to have achieved promising results in small scale practice and was given wide publicity, a feed cost reduction of from six to nine dollars per head of cattle being then estimated. (The estimated savings per head is currently about nineteen dollars.) However, for numerous reasons to be examined, the results in actual use have not lived up to expectations.

The principal use of fodder expanders is at centralized feed lots where large numbers of cattle are gathered to be fattened for market. These feed lots contain tens or hundreds of thousands of cattle which consume vast quantities of fodder (approximately 24 pounds per head of cattle per day). Location of the fodder expansion apparatus in the immediate vicinity of the feed lots is essential to avoid the prohibitive cost of shipping such quantities of bulky expanded fodder. The apparatus must thus be used in a field, as opposed to a laboratory or factory, environment and is located in relatively remote regions where equipment servicing is expensive and inconvenient and where well trained operating and maintenance personnel are unlikely to be found. Another economic feasibility requirement is that the expansion apparatus must be in substantially continuous operation to meet the fodder demands. It must therefore be extremely reliable.

Fodder expansion apparatus heretofore used have, to the contrary, proven quite unreliable. A major reason for this unreliability relates to the fact that satisfactory means has not previously, to the applicant's knowledge, been developed for introducing the untreated fodder into the pre-expansion pressurizing region without first depressurizing the region; that is, only batch expanders have as yet been employed. In a batch expander, the pressure vessel in which the fodder is heated and pressurized is first filled with fodder and then pressurized with steam. After a short pressurization period, the fodder is ejected to the atmosphere for expansion. The vessel must be vented before another batch of fodder is introduced and then repressurized before processing of the new batch is commenced. To compensate for lost vessel-filling time in order to achieve reasonable flow rates of fodder through the apparatus, the pressurization period is generally made quite short-typically only about 15 to 20 seconds-representing only a fraction of the entire batch cycling time. This short pressurization period, because of the relatively large, stationary mass of fodder, generally results in inadequate pressurization of a significant amount of the fodder, with the result that these under-pressurized particles do not subsequently expand sufficiently to convert all the starch to dextrin. To further compensate for lost vessel-filling time, fodder particles are generally transported through the apparatus at high velocity. Because of the abrasiveness of the fodder, rapid internal wear of the apparatus, particularly in regions (such as elbows) of abrupt direction change, results and frequent shutdowns are necessary to replace eroded parts.

Still other problems relate to the general use of large quantities of high quality, that is, dry, boiler steam for heating and pressurizing the fodder and for ejecting it to the atmosphere. Further, the cyclic venting of the pressurized vessel causes moderate losses of high energy steam and is therefore wasteful not only of the boiler feed water from which the steam is created, but also of the energy used to create the steam. This large consumption of boiler steam by existing equipment has necessitated installation at feed lots of extensive water softening facilities for producing boiler feed water. This not only results in added expense, but problems associated with the water softening systems have frequently caused shutdown of the entire expansion apparatus.

Another major problem has been that the expanded fodder generally requires auxiliary drying before handling or storage because of its high water content. This is because the moisture initially present in the fodder-typically twelve to fifteen percent by weight-operates as an energy sink and absorbs so much energy from the pressurizing and the ejecting steam that some of the steam is condensed into water. When this water is ejected with the fodder, it is absorbed by the expanded fodder, causing the expanded fodder to be too wet to be easily handled or stored. In order to produce, by present expansion processes and apparatus, an expanded fodder sufficiently dry for handling or storage, steam boiler horsepower would have to be increased several fold. Generally, as an alternative to increasing boiler horsepower, large auxiliary dryers are used to dry the expanded fodder, thereby still greatly increasing system complexity and cost.

A problem of increasing significance is the high noise level produced by the expansion process. The explosive decompression of the material is not the sole noise source. Considerable noise is produced by supersonic expansion of the high pressure steam leaving the ejection opening or nozzle. When the ejection region is full of fodder, the steam expansion noise is attenuated to some extent; however, in batch processing there are frequent periods when there is an outflow of expanding steam with the ejection region virtually empty of fodder, and thus there is no noise attenuation. Also, no attention has previously been directed to the fact that the nozzles or restrictive openings used at the ejection point have subsonic characteristics, whereas the steam expansion is generally supersonic.

An object of this invention is to provide an improved method and apparatus for expanding fodder material whereby the desired beneficial results may be achieved with minimized deficiencies such as above described. To this end, a continuous flow fodder expander is provided which recirculates boiler steam to create heating, pressurizing and ejecting steam from untreated city water and which automatically maintains a predetermined ejection region enthalpy regardless of moisture content of the fodder, in order to insure a dry expanded product.

The system to be described, with relatively low fuel flow and without requiring superheat, obtains a consistent lightweight product having low moisture content. It can handle different grains on an individual basis and is capable of processing high bulk density products that are resistant to flow. The system is more efficient than known steam processes in that it processes more grain for the same system input energy or can produce higher nozzle enthalpy with the same product weight per unit of time. The system is automatically controlled to handle the particular product and is also adjustable to handle different products of different bulk density.

Other objects will be apparent from the description and the appended claims.

SUMMARY OF THE INVENTION

The method and apparatus of the present invention, according to a preferred embodiment, comprise the steps of, and means for, introducing fodder material to be expanded into a pressurized region while maintaining substantial pressure in this region, transporting the material through this pressurized region in a substantially continuous manner to an ejection region, and ejecting the material through a restrictive opening or nozzle (preferably a supersonic nozzle) into a lower pressure region where the material expands into puffed form.

Stated more specifically, a recirculating steam boiler creates high enthalpy, dry steam from available water for heating, steaming and pressurizing the fodder material in the pressurized region. A large diameter screw transports the material through a reactor in the pressurized region in a direction opposite to the flow of steam so as to achieve optimum enthalpy transfer from the steam to the material. Additional enthalpy is added to the material by a second flow of dry steam, also created from available water, which ejects the material into a low pressure expansion region.

To insure a dry expanded product with minimum energy use, the enthalpy at the ejection region is maintained within a selected range (for livestock fodder preferably 450 to 750 BTU per pound of moisture being ejected in the form of steam, water and moisture in the fodder material) regardless of initial moisture content of the material, by automatic controls which maintain a predetermined pressure, related to nozzle enthalpy, in the pressurized region. This controlling is accomplished by varying steam boiler enthalpy output and, if necessary, by varying the flow rate of the fodder material into the pressurized region.

DESCRIPTION OF THE PREFERRED EMBODIMENT

Figure 1:
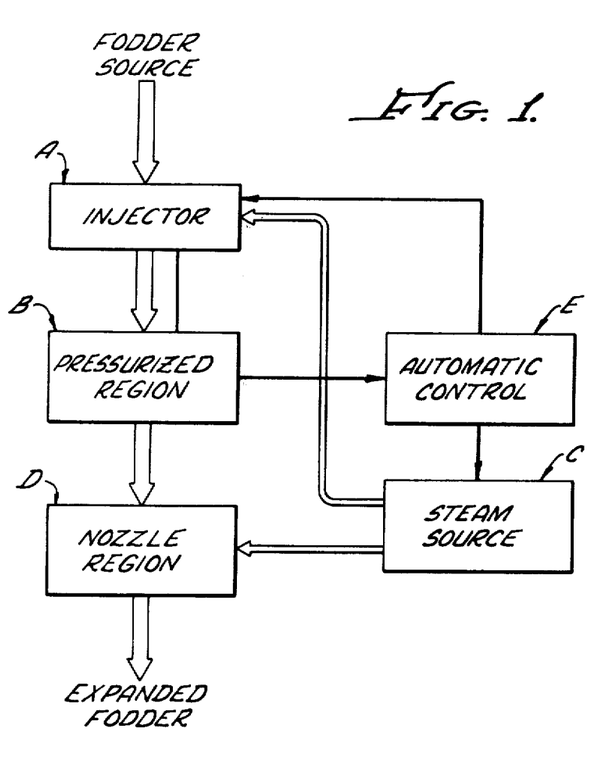
FIG. 1 is a block diagram showing major portions of the fodder expander.

By way of introduction, and as diagrammed in FIG. 1, fodder material to be expanded is introduced through, and by, an Injector A into a Pressurized Region B. As the fodder is transported in a continuous manner through Pressurized Region B, it is heated and steamed by a counterflow of high enthalpy, dry processing steam from a Steam Source C. (Enthalpy is a thermodynamic expression for thermal potential of a vapor system in flow, comprising an internal energy term and a term relating to the pressure and volume of the system.) This processing steam also provides the pressurizing for Pressurized Region B and is instrumental in introducing the fodder into the Pressurized Region through the Injector.

From the Pressurized Region, the fodder is transported to a Nozzle Region D where it is ejected by a flow of high enthalpy, dry ejection steam from Steam Source C into the atmosphere for expansion.

Enthalpy in Nozzle Region D is controlled within a predetermined range by Automatic Control E, to assure dryness of the expanded fodder. Nozzle enthalpy, supplied by the processing and ejecting steam flows from Steam Source C, is automatically controlled within the predetermined range, regardless of the initial moisture content of the fodder, by sensing and controlling a corresponding pressure in Pressurized Region B. This pressure is an accurate and sensitive measure of nozzle enthalpy, decreasing as nozzle enthalpy decreases and increasing as nozzle enthalpy increases.

Automatic Control E maintains the pressure in the Pressurized Region within a predetermined range by first varying the enthalpy output of the Steam Source (an increase or decrease in enthalpy from the Steam Source causes a corresponding increase or decrease in Pressurized Region B pressure) by varying fuel flow to a steam boiler in Steam Source C. If the predetermined pressure cannot be maintained by so doing, the flow rate of fodder material into Pressurized Region B through Injector A is varied, such that there is less or more fodder moisture moving through Pressurized Region B to absorb enthalpy from the steam, thereby correspondingly increasing or decreasing the pressure in Pressurized Region B.

For convenience, the ensuing description of a preferred embodiment is divided into the general headings just mentioned and shown in FIG. 1; however, the order is changed for purposes of clarity.

The described preferred embodiment provides primarily for processing the more commonly used fodder grains, such as corn, barley and milo. Variations applicable for processing lower density fodder materials, such as chopped hay or straw, will be provided at the appropriate place.

PRESSURIZED REGION B

Figures 2, 7:
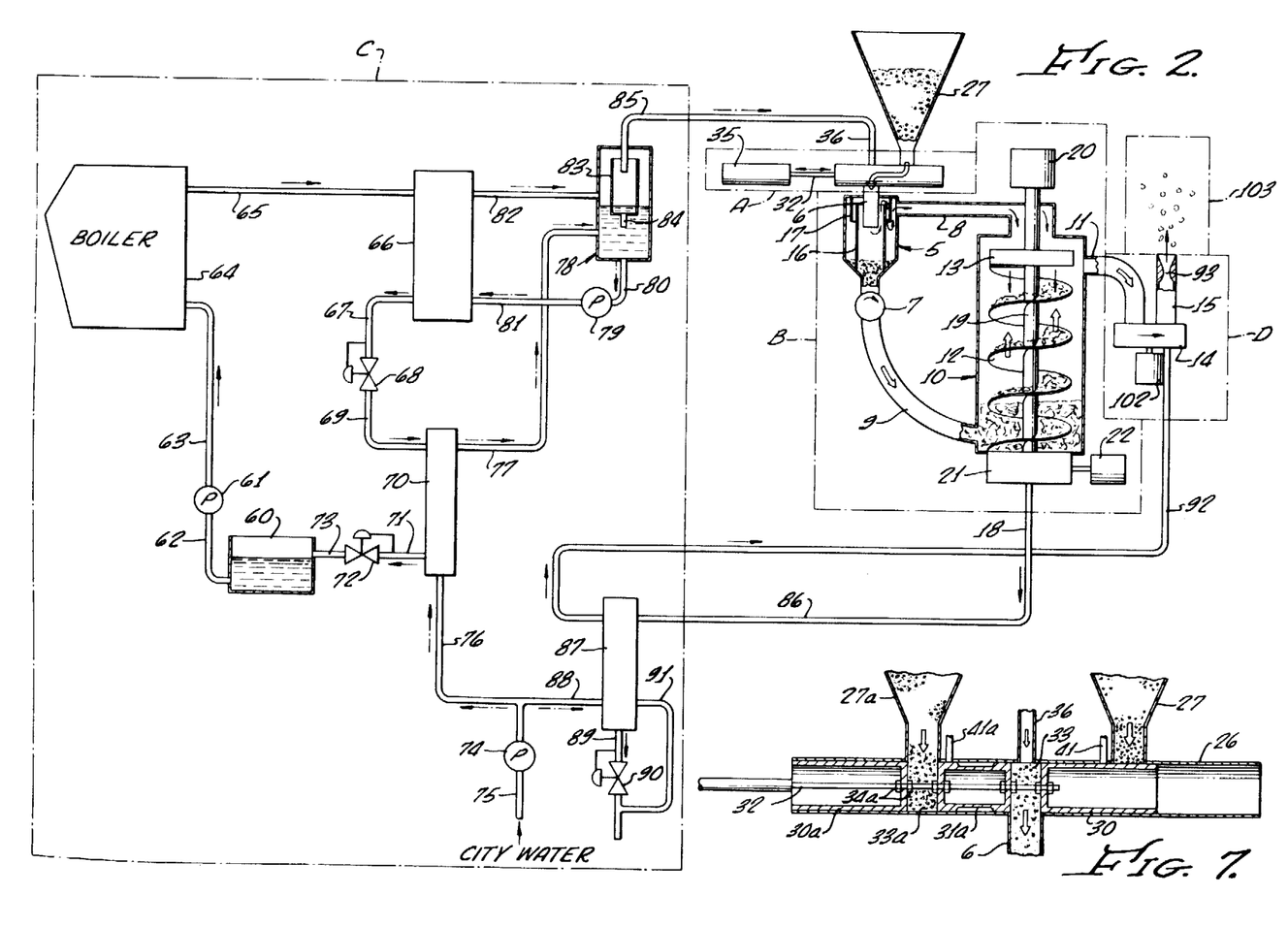
FIG. 2 is a schematic drawing of the apparatus of FIG. 1.
FIG. 7 is a vertical section of a variation of the fodder injector showing two cavities, one filling while the other is emptying.
Figure 10:
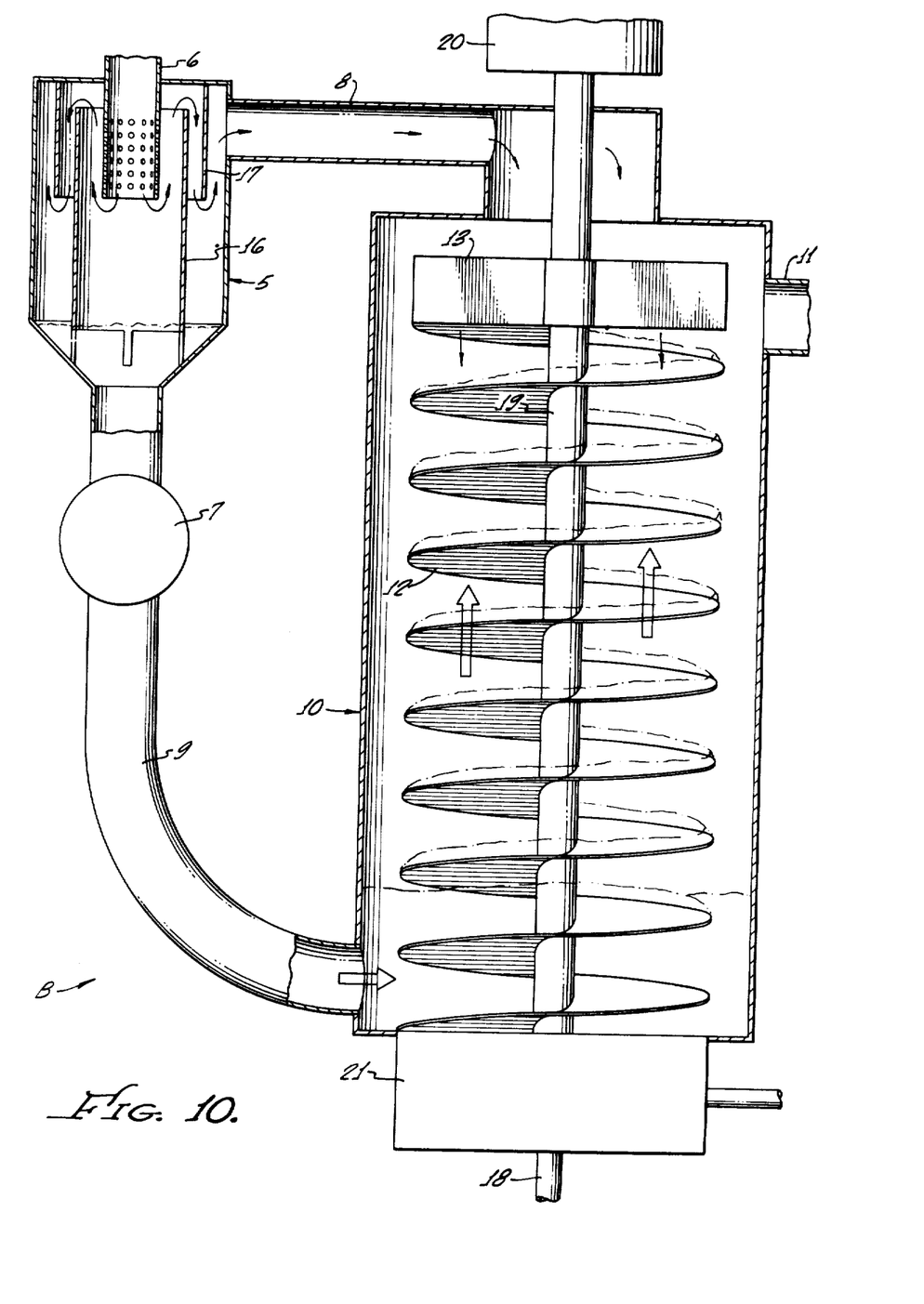
FIG. 10 is an enlarged view of pressurized Region B as shown in FIG. 2.

The essential function of heating, steaming and pressurizing the fodder prior to its ejection into the atmosphere for expansion into puffed form is performed in Pressurized Region B, which comprises several communicating components, as seen in FIGS. 2 and 10, all of which are at substantially the same high pressure.

The fodder to be expanded is injected into a pressurized separator 5 by a flow of high enthalpy, dry steam (herein referred to as processing steam), passing through Injector A to be described below. In separator 5, which is closed except for a steam and fodder inlet pipe 6, a fodder outlet metering valve 7 and a steam outlet pipe 8, the fodder and steam are separated by a disengaging process so that they may later flow counter to each other for optimum enthalpy transfer to the fodder. The fodder entering via pipe 6 falls by gravity to the conical bottom of the separator, from which it is fed by metering valve 7 (for example, a conventional star valve), into a downwardly curved pipe 9. The fodder then falls by gravity through pipe 9 into the lower side of a cylindrical reactor 10. Within reactor 10, to be more fully described below, the fodder is upwardly transported in a continuous manner toward a fodder outlet pipe 11, by a large rotating screw 12. During this transport through the reactor, the fodder is subject to a counter, or downward, flow of pressurizing steam from separator 5, which enters the top of reactor 10 via a steam pipe 8 interconnecting the separator and the reactor.

As the upwardly transported fodder in reactor 10 reaches the level of fodder outlet pipe 11 near the top of reactor 10, a portion of the fodder is deflected by a rotating deflector vane 13 into the outlet pipe, through which the fodder falls by gravity into Nozzle Region D. Region D comprises a metering valve 14, which transports the fodder to an ejection pipe 15 from which it is ejected to the atmosphere for expansion into puffed form.

More specifically, the separation of the incoming fodder and processing steam in separator 5 is accomplished by requiring the processing steam flow to change direction abruptly before exiting the separator. The processing steam is thereby prevented from carrying with it quantities of fodder as it leaves pipe 8.

To accomplish disengagement, inlet pipe 6, axially affixed to the otherwise closed top of separator 5 as by welding, has an open lower end which extends well below the opening to steam outlet pipe 8 which is located near the top of the separator. Inlet pipe 6 contains numerous holes through its side near its open lower end below the separator opening to pipe 8 so that the processing steam starts separating from the fodder within pipe 6. When the processing steam leaves pipe 6 through either the side holes or the open bottom, it must change direction and flow up towards the top of the separator to reach the opening to outlet pipe 8. As a result of directional changes, the fodder particles fall from the steam flow to the bottom of the separator. Only a minimal quantity of processing steam, that which fills the void between fodder particles, flows along with the fodder through metering valve 7.

The disengaging action described above is generally adequate for the heavy, more commonly used fodder materials, such as corn, barley and milo. Additional disengagement may be required for lighter fodder materials, such as chopped hay or straw. If use of such lighter fodder materials is anticipated, baffles may be installed in separator 5 to cause the flow of processing steam to make more directional changes. The size of separator 5 may also be increased over the size suitable for heavier fodder materials if lighter materials are to be processed in the same apparatus.

To provide additional disengagement in separator 5 for lighter fodder materials, a tubular inner baffle 16, open at both upper and lower ends, is axially supported within separator 5, as by being attached to the lower conical portion and sides of the separator, with its lower end below the normal fodder level at the bottom of the separator. Steam flow around the bottom of baffle 16 is thus blocked. The upper end of baffle 16 is near, but spaced from, the top of the separator to allow steam flow over baffle 16. A tubular outer baffle 17 depends coaxially around inner baffle 16 from the top of separator 5, its open lower end being substantially below the separator opening to pipe 8 through which the processing steam exits the separator. To exit separator 5 via pipe 8, processing steam entering the separator with the fodder via inlet pipe 6 must first flow upward from the bottom of pipe 6 and over the top of inner baffle 16. The steam must then flow downward and under the bottom of outer baffle 17 before it again flows upward towards outlet pipe 8. By this means additional disengagement is provided for the lightweight fodder materials.

Although the fodder and processing steam enter separator 5 via pipe 6 together in parallel flow, there is relatively little enthalpy transfer from the steam to the fodder because of the short intermingling time before they are separated, the fodder falling to the bottom of the separator and leaving through valve 7, and the processing steam, after disengagement, leaving via pipe 8. Substantially all of the enthalpy interchange from the processing steam to the fodder occurs in reactor 10 wherein there is a counterflow, rather than a parallel flow, of fodder and processing steam.

Reactor 10 comprises a large pressurized vertical cylinder, closed except for steam inlet pipe 8, a steam outlet line 18, fodder inlet pipe 9 and a fodder outlet pipe 11. The inner diameter of reactor 10 is substantially larger than the outer diameter of screw 12 which is coaxially mounted within the reactor and which transports the fodder up through the reactor from inlet pipe 9 to outlet pipe 11. Because of the spacing between the screw and the reactor and their vertical arrangement, some of the fodder being upwardly transported by screw 12 falls off the edges of the screw back toward the bottom of the reactor for recirculation. Deflector vane 13, rotating with screw 12, both being nonrotatably mounted on a common shaft 19 driven by a motor 20, as by a system of gears (not shown), deflects many of the fodder particles reaching the level of outlet pipe 11 to the inner side of the reactor where they too fall back down for recirculation. This continuous recirculating assures that virtually all fodder particles receive uniform and adequate heating, steaming and pressurizing, as required for uniform and optimum expansion.

The rotational speed of screw 12 determines the average transit time of fodder particles through reactor 10. To maintain a constant mass flow rate through the reactor, screw 12 may be rotated faster, to increase the bulk flow rate through the reactor, for less dense fodder materials, and may be rotated slower, to reduce the bulk flow rate through the reactor, for more dense material. The rotational speed may be varied by a conventional gear connection (not shown) between shaft 19 and motor 20.

The counterflow of processing steam and fodder within reactor 10 is necessary for optimum heating, steaming and pressurizing of the fodder to assure a uniform, well-expanded product. During this counterflow, much of the processing steam enthalpy is absorbed by the fodder and its initially included moisture, as the former is raised to the temperature of the steam and the latter is raised to the boiling point of water. The processing steam, flowing axially downward from pipe 8 at the top of reactor 10, is driest and at its highest enthalpy level when it is flowing past the fodder particles which are deflected from reactor 10 into pipe 11, and is wettest and at its lowest enthalpy level as it flows past the fodder particles just entering the bottom of reactor 10 through pipe 9. The processing steam then exits the reactor bottom via line 18, after passing through a rotating screen 21, driven by a motor 22, to prevent fodder being carried along with the exiting steam. Processing steam is otherwise prevented from exiting reactor 10 along with the fodder through pipe 11 by valve 14, through which only a minimal amount of steam exits between the fodder particles.

INJECTOR A

Injector A performs the critical function of introducing, or injecting, fodder material from a source of fodder at low or ambient pressure into Pressurized Region B (or, as described above, into separator 5 via pipe 6), while pressure is maintained in the Pressurized Region and processing of previously introduced fodder continues in an uninterrupted manner. In this respect, Injector A may be considered a conveyor which transports fodder material from a source to the Pressurized Region B.

Figure 3:
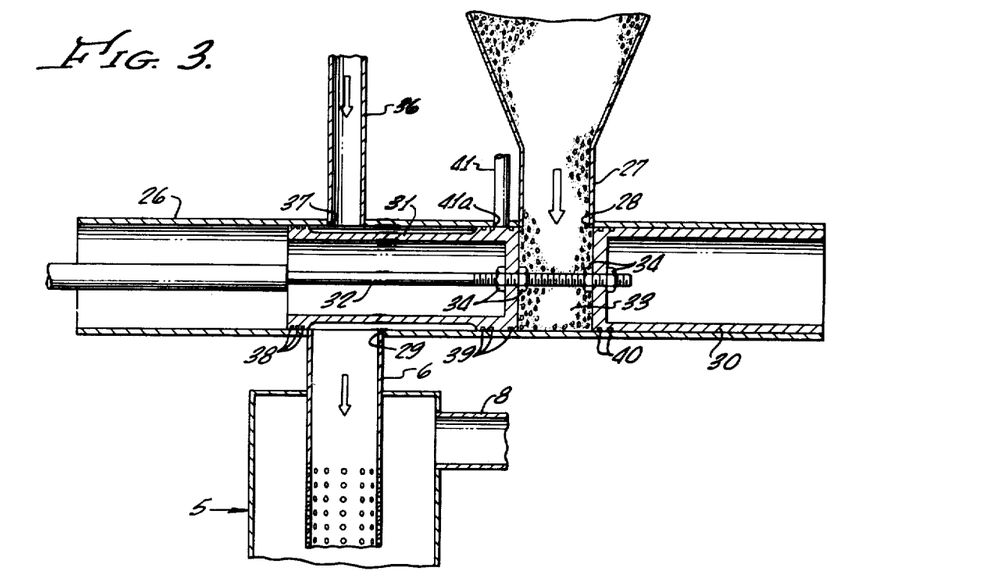
FIG. 3 is a vertical section of the fodder injector showing its construction and its cavity in the filling position.
Figure 4:
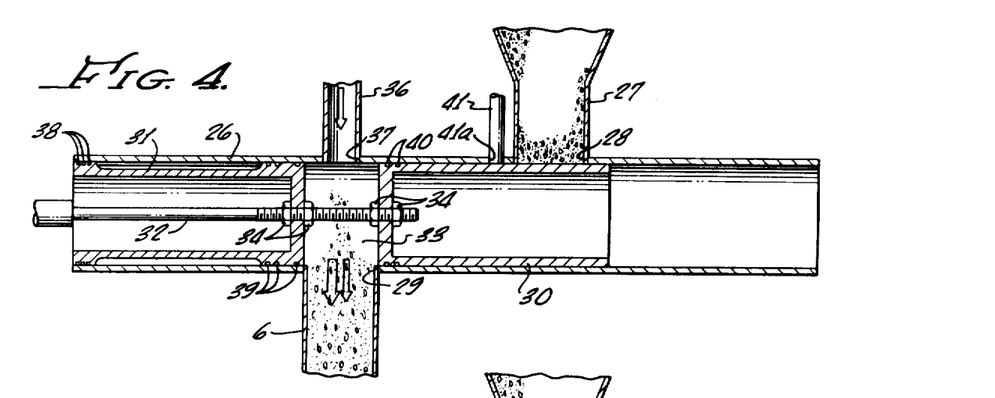
FIG. 4 is a vertical section of the fodder injector showing its construction and its cavity in the emptying position.
Figure 5:
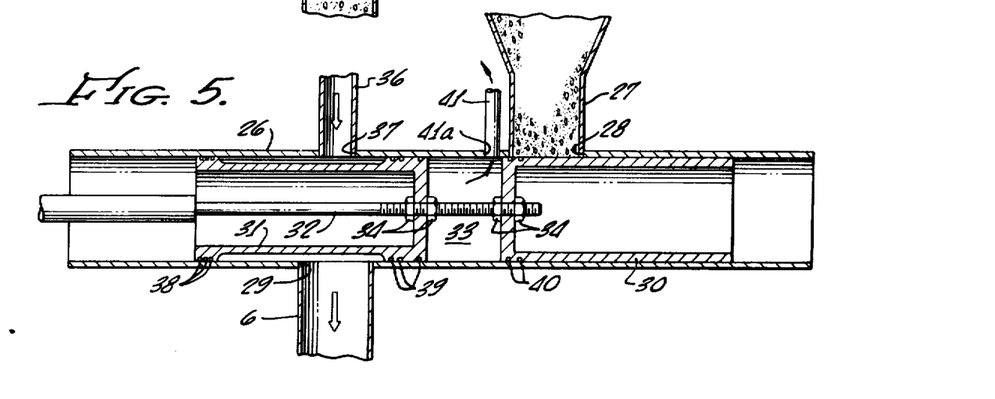
FIG. 5 is a vertical section of the fodder injector showing its construction and its cavity in the venting position.

The Injector, as best seen in FIGS. 3, 4 and 5, comprises a horizontal piston sleeve or cylinder 26, which is cylindrical and may be termed a chamber. The sleeve is attached toward one end, as by welding, to the bottom of a fodder hopper 27, which hopper is generally conically shaped and is positioned vertically above sleeve 26 for gravity feed of fodder thereinto. A first opening 28 in the sleeve, registered with hopper 27, provides communication between the bottom of the hopper and an intake region of the sleeve. Sleeve 26 is also attached towards its opposite end, for example by welding to the upper end of the pipe 6 which connects to separator 5. A second opening 29 in sleeve 26, in line with pipe 6, provides communication between such pipe and the discharge region of the sleeve.

The sleeve 26 has axially mounted therein a conveyor comprised of two aligned pistons, both preferably made of generally the same metallic material as sleeve 26. The first piston 30 has a constant or uniform outside diameter, being installed at the hopper end of sleeve 26. The second piston 31 is spool-shaped and is mounted at the separator end of the sleeve. Pistons 30 and 31 are shown as being hollow but have closed or solid ends relatively adjacent each other. The closed piston ends are spaced apart on a common shaft 32, to create a chamber or cavity 33 defined by the adjacent closed piston ends and by the inside surface of sleeve 26. The axial length of cavity 33 is preferably, but not necessarily, substantially the same as the diameter of openings 28 and 29 in the sleeve. Pistons 30 and 31 are fixed together and maintained in their spaced relationship as by plural lock nuts 34 on shaft 32, installed on both sides of the adjacent piston ends.

Conjoint axial movement of pistons 30 and 31 in sleeve 26 is accomplished by a hydraulic actuator 35 (FIGS. 2 and 6) which is attached at one end of shaft 32. Movement of the pistons by actuator 35 is such as to first register cavity 33 with hopper 27 for gravity filling with fodder, and then with pipe 6 for emptying the fodder into separator 5.

The relationship between the length of piston 31 and the spacing between hopper 27 and pipe 6 is such that, as shown in FIG. 3, when cavity 33 is being filled with fodder from hopper 27, opening 29 to pipe 6 communicates with the annulus surrounding spool piston 31. A steam inlet line 36 is attached to sleeve 26 in axial alignment with pipe 6, and then communicates via a third opening 37 with the indicated annulus. Line 36 provides a full flow of processing steam into sleeve 26, around the annulus region of piston 31 and into separator 5 through pipe 6, separator 5 being at a slightly lower pressure than the processing steam pressure at inlet line 36 due to the pressure drop across the injector. In this cavity filling position, pressure escape from separator 5 and steam inlet line 36 to the atmosphere around the left end of piston 31 away from cavity 33 is prevented by plural, preferably at least three, piston rings 38, installed in that larger outer diameter end of piston 31. Pressure is similarly prevented from escaping around the cavity end of piston 31 by plural, preferably at least three, piston rings 39 installed in that larger outer diameter end of piston 31.

The length of piston 30 is such that when, as depicted in FIG. 4, cavity 33 is aligned with pipe 6 for emptying fodder into separator 5, opening 28 to hopper 27 is completely sealed by the outer diameter of piston 30, thereby preventing unwanted fodder discharge into the sleeve. When cavity 33 is aligned with pipe 6, processing steam from line 36 flows directly through cavity 33 and pipe 6 into separator 5, thereby sweeping the fodder from the cavity into the separator to provide rapid and virtually complete discharge from the cavity. Escape of the steam from the cavity region is prevented by the piston rings 39 on piston 31 and by similar plural, preferably at least two, piston rings 40 installed toward the cavity end of piston 30.

A steam vent line 41, attached to sleeve 26 as by welding, and communicating with the inside of sleeve 26 via a fourth opening 41a, is positioned between openings 37 and 28 and vents pressure from cavity 33 after the cavity is out of communication with steam inlet line 36 and pipe 6 where it becomes pressurized, and before it recommunicates with hopper 27 (FIG. 5). Therefore, when the cavity comes back into alignment with the hopper, there is no cavity pressure to retard filling or to blow fodder from the hopper.

Figure 6:
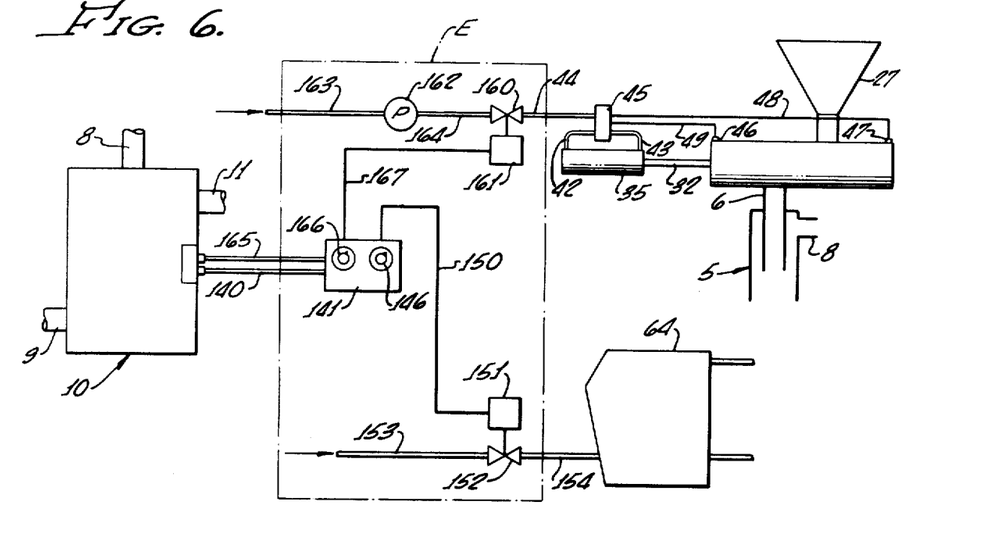
FIG. 6 is a schematic drawing showing control of the boiler fuel valve and the injector hydraulic pressure regulator.

Actuator 35, for pistons 30 and 31, as schematically shown in FIG. 6, is operated by hydraulic pressure in either of two hydraulic lines 42 and 43 which enter at opposite ends of the actuator. Pressure from a hydraulic line 44 is shunted between lines 42 and 43 by an electrically controlled solenoid valve 45 connected thereto. Valve 45 is controlled as by two electrical microswitches 46 and 47 located at opposite ends of piston sleeve 26 and actuated by pistons 30 and 31 at their extreme positions of travel. At one extreme of piston travel (cavity 33 aligned with hopper 27 for filling) the end of piston 30 away from the cavity closes a contact an microswitch 47 to signal valve 45, via an electrical line 48, to shunt hydraulic pressure from line 42 to line 43, thereby reversing actuator piston travel and moving the cavity away from the hopper and toward pipe 6. In an analagous manner, at the other extreme of travel (cavity 33 aligned with pipe 6 for discharging), the end of piston 31 away from the cavity closes a contact on microswitch 46, thereby directing valve 45, via an electrical line 49, to shunt hydraulic pressure back to line 42 to again reverse actuator piston travel and move the cavity back toward the hopper for refilling. By this means, cyclic action of the cavity is achieved, the cycling rate, as later discussed in more detail, being variable according to the hydraulic pressure supplied to actuator 35--the higher the hydraulic pressure, the faster the cavity cycling rate.

Because of the relatively low velocity of piston 30 and 31 travel (normally only about 28 cycles per minute for the preferred embodiment) no lubricant is required between the injector parts in sliding contact, that is between piston rings 38, 39 and 40 and the inside of piston sleeve 26, it being generally sufficient that the inner surface of sleeve 26 have a smooth, hard surface, such as provided by hard chrome plating, and that the piston rings be of some metallic material such as iron or steel.

In a variation of the preferred embodiment, shown in FIG. 7, an additional constant (uniform) diameter piston 30a, similar to piston 30, is installed on shaft 32, as by lock nuts 34a, its closed end separated from the end of a solid spool piston 31a (similar to spool piston 31, except that it has two closed ends) which is away from piston 30. A second cavity 33a is thereby created between piston 30a and piston 31a. The piston configuration is such that when cavity 33 is aligned for emptying into pipe 6, the emptying being assisted by a flow of processing steam from line 36, cavity 33a is aligned for gravity filling from a second material source or hopper 27a. Similarly, when cavity 33 is aligned for gravity filling from hopper 27, cavity 33a is positioned for emptying into pipe 6. In this manner, two different materials from different sources may alternatively be introduced into the same pressurized region at different rates, assuming different cavity sizes, or the same material may be injected at an increased rate from two different hoppers. An additional vent line 41a, similar to vent line 41', is provided to vent cavity 33a in the same manner as described above for cavity 33.

STEAM SOURCE C

It is common knowledge that when sufficient energy in the form of heat is supplied to water, its temperature will be raised to the boiling point (212° F.), and the water will be converted into steam. Such steam is normally comprised of a mixture of moist vapor and dry gas, only the moist vapor being visible to the eye. As more heat is applied to the steam, more of its moist vapor will be converted to dry gas. In thermodynamic parlance, the "quality" of the steam increases as it becomes more gaseous or dry. When sufficient heat has been applied, all of the moist vapor in the steam will be converted to dry gas, and the steam will be of 100% quality. At ambient pressure, this occurs at 212° F. As still more heat is applied, the temperature of the dry steam will be raised above 212° F., the steam becoming superheated.

The process described above is reversed as heat is absorbed from the steam. The steam gradually becomes moister, that is its quality is reduced, until at last the steam contains only moist vapor. In this condition, the steam is said to be of zero percent quality. As still more heat is absorbed from the steam, its temperature begins to fall below 212° F., and some of the wet steam condenses into water. At this point, the steam is said to have a quality level below zero. This latter is commonly observed when steam impinges upon a cooler object and droplets of condensed water form on the surface of the object.

PROCESSING STEAM

In the preferred embodiment, dry, preferably saturate (i.e., non-superheated) steam with high enthalpy (that is, steam with high internal energy and pressure) is provided to steam, heat and internally pressurize the fodder particles prior to their expansion into puffed form.

The fodder particles and the moisture initially present in the fodder as it is introduced into the expansion apparatus are at ambient temperature and are thus cooler objects against which the processing and ejection steam are directed. In raising the temperature of the fodder and its moisture, the fodder absorbs heat, or more accurately enthalpy, from the steam being used to pressurize and eject it. Depending upon the relative mass flow rate of the fodder and the processing and ejection steam, the moisture content of the fodder, and the quality and enthalpy of the steam, so much enthalpy may be absorbed from the steam by the fodder and its moisture that some of the steam may be condensed into water. When such condensation occurs and the water is ejected with the fodder into the expansion region, much of the water will be absorbed by the expanded fodder, making it wet and difficult to handle or store.

To prevent such occurrence, it is necessary to maintain the enthalpy at the fodder ejection region at a sufficiently high level to assure that the quality level of the steam passing through the nozzle, in the form of ejection steam and moisture in the fodder which has been converted into steam, does not fall below zero. To this end, the preferred embodiment uses one flow of high enthalpy, dry steam, referred to as processing steam, to heat, steam and pressurize the fodder. And, rather than use this same steam with reduce enthalpy and quality to also eject the fodder, a second flow of high enthalpy, dry steam, referred to as ejection steam, is used to eject the pressurized fodder into the expansion region.

Further, to avoid consumption of large quantities of boiler feed water which is required to be softened to prevent boiler scaling, as when boiler steam is directly used for processing and ejection, boiler steam is not consumed, but is used only to generate, by means of heat exchangers, a "secondary" source of steam from available untreated city or tap water, herein referred to as city water. It is this secondary steam that is employed to process the fodder and to create the ejection steam as described below.

Referring to FIG. 2, boiler feed water from a tank 60 is supplied by a water pump 61, via water lines 62 and 63, to a high efficiency steam boiler 64, wherein the feed water is converted into steam, herein referred to as boiler steam, by heat supplied by the boiler.

Boiler steam is routed from the boiler by a steam line 65 to a vaporizer 66 which may be, for example, a heat exchanger of conventional tube and shell design, wherein a supply of available city water is converted by boiler steam into low quality "secondary" steam employed for fodder processing. Production of low quality secondary steam in vaporizer 66 prevents precipitation in the vaporizer of impurities which may be contained in the untreated city water, which precipitation would adversely affect the characteristics of the vaporizer.

The boiler steam, with reduced enthalpy, is next routed from vaporizer 66, via a steam line 67, through a pressure valve 68, which maintains boiler steam pressure in the vaporizer, and via a steam line 69 to a conventional heat exchanger 70. In heat exchanger 70, the remaining boiler steam enthalpy preheats the city water prior to its conversion to steam in vaporizer 66, as described above. The boiler steam, largely reconverted to water within heat exchanger 70 by the enthalpy absorption of the city water, exits heat exchanger 70, via water line 71, and flows through a pressure valve 72, which maintains boiler steam pressure in heat exchanger 70, and a water line 73 back to tank 60, from which it is again recycled through boiler 64. In this manner boiler steam is completely circulated with consumption only of its enthalpy in the creation of a secondary source of steam for processing the fodder.

The city water from which the secondary source of steam is created is supplied by a pump 74 from any available source, such as a water main (not shown), via water lines 75 and 76 to heat exchanger 70, wherein as above-described, it is preheated by the boiler steam. The preheated city water is routed from heat exchanger 70, via a water line 77, to the lower region of a drum separator 78, more particularly described below, the discharge from line 77 being below the water level of preheated city water maintained in the separator. Preheated city water is next pumped from the bottom of drum separator 78 by a pump 79, whose pumping rate maintains the water level in drum separator 78, via water lines 80 and 81, to the bottom of vaporizer 66 wherein, as previously described, the preheated water is converted to low quality secondary steam.

From vaporizer 66, the low quality secondary steam created therein is routed, via a steam line 82, to the upper region of drum separator 78 (a large cylindrical tank), where it radially enters above the level of the preheated water therein. The incoming steam impinges upon a baffle 83, a large diameter, hollow cylinder, axially supported, in a manner not shown, from the inside top of the drum separator such that its open upper end is near the top of the drum separator and its lower end is below the level of the preheated water in the bottom of the separator, communicating therewith via a short pipe 84 which extends axially downward from the bottom of the baffle.

To exit the drum separator, via a steam line 85 at the top of the separator, the incoming low quality secondary steam from vaporizer 66 must flow upward and over the top of baffle 83, then down into the baffle toward the surface of the preheated city water in the bottom of the drum separator, and then up and out the inner end of line 85 which projects axially down into baffle 83. These abrupt changes in direction of steam flow reduce the velocity of the steam to below the disengaging velocity of the moist vapor in the steam; consequently, the moist vapor separates from the dry gas in the steam and falls to the bottom of the drum separator where it adds to the preheated city water. By this means, the quality of the incoming steam is substantially increased without loss of enthalpy, the exiting steam being of high, preferably 100 percent, quality, and preferably being saturated rather than superheated because such saturated steam is less expensive to produce than the superheated steam used in prior batch expanders and is less harmful to the fodder (per Algeo).

The high quality processing steam is routed from separator 78 via line 85 to steam line 36 at sleeve 26 of the fodder injector, and thence into separator 5 and reactor 10 where, as described above, it is used to heat, steam and pressurize the fodder prior to its expansion into puffed form.

EJECTION STEAM

The above-described processing steam, as it leaves the bottom of reactor 10 via line 18, after having steamed and heated the fodder therein, still has considerable enthalpy, but its quality level will have been reduced to such a low level that it is too wet to be diectly used for ejecting the fodder from the nozzle region. This steam still has, however, sufficient enthalpy to create a new, lesser flow of high quality ejection steam.

To this end, as seen in FIG. 2, processing steam exiting reactor 10 is routed from reactor 10, via line 18 and a connecting steam line 86, to a conventional heat exchanger 87 wherein steam for ejecting the fodder from the nozzle region, or so-called ejection steam, is created from a third source of available water entering heat exchanger 87 via a water line 88. High quality ejection steam is directly created in heat exchanger 87 without use of a disengaging drum, such as drum separator 78. Because the flow of ejection steam is relatively low, there is little scale buildup in heat exchanger 87. This third source of water for the ejection steam may be city water supplied to heat exchanger 87 by pump 74, via water line 88. The ejection steam water may alternatively be supplied from processing steam condensate which exits heat exchanger 86 via a water line 89, through a pressure regulating valve 90. Pressure regulating valve 90 acts as a flow restrictor to help maintain pressure in reactor 10 and to prevent fodder packing in reactor 10 during start-up. It does this by sensing the pressure drop across both the reactor and heat exchanger 87, and maintaining it within a predetermined range, preferably two to three psi, by opening or closing to increase or decrease steam flow through the reactor and heat exchanger. The processing steam condensate will have been appreciably softened by the impurities initially present in the processing steam being precipitated on the fodder particles. A portion of this condensate, after filtering, may be directed by a water line 91 to heat exchanger 87 where its use as a source of water for the ejection steam will largely prevent any scaling of the heat exchanger which might otherwise occur.

The dry, preferably saturated steam created in heat exchanger 87 is routed via steam line 92 directly to metering valve 14 where, as described below, it ejects the fodder into the atmosphere where expansion into puffed form occurs.

NOZZLE REGION D

After the fodder has been transported, heated, steamed and pressurized in reactor 10, it falls under gravity through pipe 11 into metering valve 14 wherein it is transported into alignment with pipe 15, as seen in FIG. 2. The fodder is ejected from pipe 15 to the atmosphere where fodder expansion occurs, through a restrictive opening 93, preferably a supersonic nozzle, by a flow of ejection steam from line 92.

Restrictive opening 93, as mentioned, preferably comprises a supersonic nozzle wherein the ejection steam may expand supersonically to minimize nozzle noise. As seen in FIG. 9, the supersonic nozzle 93 comprises a short region 94 converging to a throat 95. From throat 95, a long region 96 diverges to an outlet opening 97, the ratio of the diameter of outlet opening 97 to that of throat 95 preferably being on the order of 3:2 to provide for the supersonic expansion within the nozzle, although this ratio may vary according to the pressure and flow rate of the steam and density and flow rate of the fodder material.

Although the supersonic nozzle may be made of circular cross-section, it is preferably rectangular in cross-section, with hinges at points 100 and 100*a* and at 101 and 101*a*, whereby at least one cross-sectional dimension of throat 95 and outlet 97 may be varied so that the characteristics of the nozzle may be changed to conform to variations in system parameters.

Metering valve 14 is of conventional design and comprises a plural sectioned star valve similar to metering valve 7 at the fodder outlet of separator 7 and is driven by a motor 102. Internal sealing, not shown, of conventional means, prevents internal steam leakage from pipe 11 to pipe 15, the former being at the pressure of the processing steam and the latter being at the lower pressure of the ejection steam. Because this pressure differential is relatively small, elaborate means, such as use of an injector similar to Injector A, is not required to transport the fodder from pipe 11 to pipe 15. Although such as Injector A could be used and would perform the required transport function, such complexity is not required and would result in added, unnecessary cost.

Ejection steam, entering metering valve 14 via line 92 and ejecting the fodder material from nozzle 93 into the atmosphere, still has considerable enthalpy that may be recovered by discharging nozzle 93 into a chamber 103 (FIG. 2) wherein by disengaging action, as described above for separator 10, the ejection steam may be separated from the expanded fodder material and be recovered to be routed, for example, to heat exchanger 70 (in a manner not shown) wherein more enthalpy may be available to preheat the city water. In this manner processing steam with the same enthalpy may be provided at reduced steam boiler 64 output. Such recovery and use of the ejection steam is within the scope of the invention.

AUTOMATIC CONTROL E:

During the fodder expansion operation, moisture is continually ejected through restrictive opening or nozzle 93. This moisture must be in the form of high quality ejecting steam and high quality steam in the fodder created from moisture initially present therein if a dry expanded fodder product is to be obtained. If some of the moisture passing through the nozzle is in the form of low quality steam, or water into which some of the steam has been condensed by the enthalpy absorption of the fodder and its moisture, a wet expanded fodder product requiring auxiliary drying will result.

Control of nozzle enthalpy, that is, the number of BTU's per pound of moisture passing through the nozzle, at a sufficiently high level will assure a high quality level of the steam passing through the nozzle, in turn assuring that no water is passing through the nozzle to be absorbed by the fodder upon its expansion.

Assuming a constant supply of enthalpy to the apparatus via the processing and ejecting steam, the nozzle enthalpy as above-defined will vary inversely with the moisture content of the fodder, for, assuming a constant flow of fodder, the wetter the fodder, the more moisture per unit time will pass through the nozzle and the available enthalpy BTU's will be shared by more pounds of moisture, thereby reducing nozzle enthalpy.

It is, however, a feature of fodder that its moisture content varies from material to material and from time to time, the latter depending in part upon climatic and growing conditions and length of time the fodder is stored before being expanded. As the fodder being used may be nonhomogeneous, there is no feasible way of determining the actual moisture of the fodder passing through the expander at any given time. If the apparatus is adjusted to provide a nozzle enthalpy assuring a dry expanded fodder product with an assumed 15 percent moisture content, introduction of fodder with moisture content of 20 percent may reduce nozzle enthalpy to a level that the expanded material will be too wet.

On the other hand, adjusting nozzle enthalpy to such a high level that fodder of any moisture content, no matter how high, will be expanded into a dry product is wasteful of the energy (boiler fuel) required to supply "excess" system enthalpy when processing relatively low moisture content fodder, and is excessively costly at current costs of several dollars per million BTU's per hour.

Another, less important, consideration in controlling excessive nozzle enthalpy relates to the fact that the degree of fodder expansion is generally related to nozzle enthalpy; the higher the nozzle enthalpy, the more the fodder is expanded. Although generally, from a nutritional point of view, the more expansion the better, handling of the material becomes more expensive as its bulk becomes less dense. At some point, the additional nutritional benefits are more than offset by the additional handling costs, and more savings result from a less expanded fodder.

An important feature of the invention is that nozzle enthalpy is automatically maintained within a predetermined range regardless of the moisture content of the fodder being processed without recourse to actually measuring the fodder moisture content or nozzle enthalpy. The lower level of the nozzle enthalpy range assures a dry expanded fodder product, whereas the upper level minimizes energy usage.

This predetermined nozzle enthalpy range is maintained at a first stage, in a manner described below, by automatically decreasing boiler output, or increasing boiler output to its maximum capacity, while maintaining a virtually constant flow rate of fodder through the apparatus. If nozzle enthalpy cannot be maintained at maximum boiler output, only then is the flow of fodder (and hence moisture) through the apparatus reduced.

By virtue of the thermodynamics of the system, there is a direct relationship between the steam pressure in the Pressurized Region B (more particularly in reactor 10) and the nozzle enthalpy. Assuming a constant steam enthalpy in reactor 10, an increase in fodder moisture, which will reduce nozzle enthalpy, causes a rapid decrease in reactor pressure as enthalpy absorption increases. The converse is likewise true. Thus, by sensing and controlling reactor 10 pressure within a range correlated with desired nozzle enthalpy, nozzle enthalpy may be controlled within a predetermined range.

BOILER OUTPUT AND STEAM ENTHALPY CONTROL:

As a first level of control, pressure is maintained within a predetermined range in reactor 10 by adjusting the processing steam enthalpy to compensate for any increased or decreased enthalpy absorption by wetter or dryer fodder in the reactor. This is accomplished by increasing or decreasing the fuel flow to boiler 64 which in turn increases or decreases boiler steam enthalpy, which in turn increases or decreases the enthalpy of the secondary processing steam created in vaporizer 66 by the boiler steam, thereby increasing or decreasing reactor 10 pressure.

Figure 8:
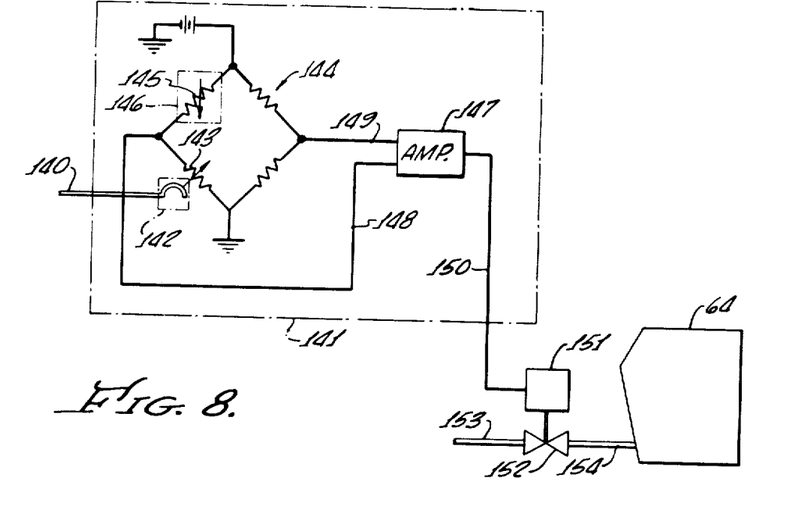
FIG. 8 is a partial schematic of the automatic boiler fuel valve control.
Figure 9:
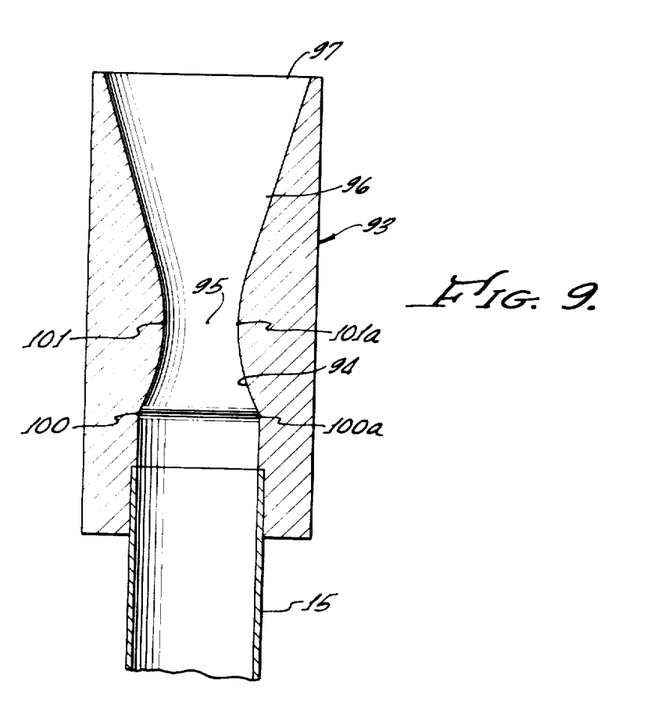
FIG. 9 is a vertical section of the supersonic nozzle.

More specifically, as shown in FIGS. 6 and 8, pressure in reactor 10 is tranmitted via a pressure line 140 to a controller 141. Within controller 141 a Bourdon tube 142, to which pressure line 140 is attached, drives a variable resistor 143, for example a resistance pot, in one leg of a first Wheatstone bridge 144. An opposing variable resistor 145 is manually adjusted by a control 146 and is calibrated to read in psi. The output across the Wheatstone bridge is fed into a first amplifier 147 via electrical lines 148 and 149. The amplifier transmits, via line 150, a voltage to a motor 151 of a motordriven valve 152 which controls fuel flowing into boiler 64 via fuel lines 153 and 154.

When the actual reactor pressure, as sensed by line 140, is substantially equal to the desired reactor pressure preset by control 146, resistors 143 and 145 will have such relative resistance values that there will be no voltage across bridge 144, and consequently there will be no voltage signal to motor 151 of valve 152. Thus, valve 152 will remain in whatever degree of openness it was in. However, when the actual reactor pressure changes, the value of resistor 143 will be changed via Bourdon tube 142 and bridge 144 will become unbalanced, the unbalance being amplified by amplifier 147. As a result, motor 151 will open or close the valve to an extent whereby the increased or decreased boiler output causes the actual reactor pressure to again be substantially at the pressure set by control 146, at which time resistor 143 will be adjusted to such value by Bourdon tube 142 that there will be no bridge output. A new fuel flow rate to boiler 64 will thus be established and will remain constant until reactor pressure again starts to vary.

Because of the fast response time of boiler 64 and the sensitivity of reactor pressure to steam enthalpy, the positioning of valve 152 by motor 151 closely follows any change in reactor pressure and the variation between actual reactor pressure and the pedetermined pressure set by control 146 never is large, except as discussed below.

In this manner, as dryer fodder is introduced into reactor 10, actual reactor pressure starts to increase. Bridge 144 becomes unbalanced by resistor 143 and valve 152 is partially closed by motor 151, reducing fuel flow to boiler 64, and hence reducing steam enthalpy to reactor 10 to reduce reactor pressure, until the reactor and predetermined pressures equalize, at which time closing of valve 152 ceases and the output of boiler 64 stabilizes with a stabilized boiler fuel flow.

The reverse occurs when wetter fodder is introduced into reactor 10. However, it is possible, as the boiler is normally used somewhere near its maximum capacity (to minimize boiler size) for a typical fodder moisture content of about 15 percent, that boiler output may be maximized by falling reactor pressure which drives valve 152 completely open, and reactor pressure still decreases.

It is in circumstances when boiler output is maximized and reactor pressure continues to decrease that a secondary, or back-up, control is provided to reduce flow of the wetter fodder into the reactor.

INJECTION CYCLING RATE AND FODDER FLOW CONTROL:

As previously discussed, the cycling rate of injector actuator 35, and hence cavity 33, is dependent upon the hydraulic pressure supplied to the actuator through solenoid valve 45, via line 44. As hydraulic pressure to the actuator increases, the actuator and cavity cycling rate increases. Conversely, as hydraulic pressure decreases, the cycling rate decreases. The cycling rate of cavity 33 determines the flow of fodder into separator 5 and thence into reactor 10.

A hydraulic pressure control regulator 160 (FIG. 6), driven by a motor 161, regulates hydraulic pressure to line 44 (and hence to actuator 35, through valve 45 and line 42 or 43), which pressure is supplied as by a hydraulic pump 162, via lines 163 and 164, from a hydraulic fluid source. Opening of regulator 160 by motor 161 causes an increase of hydraulic pressure to actuator 35. This results in an increased fodder injection rate by cavity 33. The converse is also true.

Automatic control of regulator 160 is accomplished in a manner completely analogous to that for controlling fuel valve 152, and will therefore not be described in great detail. Reactor 10 pressure is sensed via a pressure line 165 and adjusts, by a second Bourdon tube similar to Bourdon tube 142, a variable resistor similar to resistor 143 in a second bridge, similar to bridge 144, located in controller 141. A variable resistor, similar to resistor 145, is manually adjusted by a control 166, which control is set at a number of psia, for example ten, below that set by control 146.

Regulator 160 is set to be fully open and pressure at the actuator is at a maximum as determined by regulator 160 at actual reactor pressures above that set by control 166, although there may be other means for further increasing hydraulic pressure at the actuator to further increase the fodder injection rate, as by increasing the pressure output of pump 162. Thus, for any unbalanced bridge condition wherein actual reactor pressure, as sensed by line 165, is greater than the pressure set by control 166, the bridge output amplified by a second amplifier, similar to amplifier 147, and fed to motor 161 via line 167 will not and cannot cause regulator 160 to open to increase pressure to actuator 35 to increase fodder flow rate.

However, if reactor pressure begins falling below the pressure preset by control 166, as when boiler 64 at maximum capacity cannot compensate for enthalpy consumption by very wet fodder, the second bridge, unbalanced in the opposite direction, will cause motor 161 to start closing regulator 160. This will result in a reduction of fodder flow into separator 5, and thence into reactor 10, thus reducing moisture flow through the reactor and increasing reactor pressure by reducing the rate of steam enthalpy absorption. The fast reaction time of the system prevents any substantial decrease of reactor pressure below the pressure preset by control 166.

Now any unbalanced second bridge condition due to reactor pressure increasing above the pressure set by control 166 will cause motor 161 to start opening regulator 160, it already having been partially closed by the previous reactor pressure decrease. This opening of regulator 160, and the ensuing increased flow of fodder into the reactor, will prevent the increase of reactor pressure until such time as regulator 160 is fully open and the fodder flow rate is maximized (all this occurring at maximum boiler output, with valve 152 fully open).

If, after this maximum fodder flow has been reestablished, reactor pressure continues to rise, as by the fodder being dryer than previous fodder, the boiler fuel control system will reassume control when the pressure preset by control 146 is exceeded by reactor pressure.

In this manner, a substantially constant nozzle enthalpy with a substantially constant fodder flow rate is maintained for wide variations of fodder moisture content. When it is necessary to reduce fodder flow to maintain nozzle enthalpy, fodder flow will automatically be maximized before boiler output is reduced.

EXAMPLE

The following is an example of an application of the preferred embodiment, all values being understood to be approximate. Cavity 33 of Injector A is of a volume to hold 7.2 pounds of heavier fodder materials such as corn, barley and milo. The cavity is reciprocated by actuator 35 at 28 cycles per minute, resulting in a fodder flow of 12,000 pounds per hour into reactor 10 through separator 5. Consistent with this fodder flow rate, screw 12 within reactor 10 is rotated at 130 rpm by motor 20. The relative sizes of the reactor and screw are such that at this rpm and fodder flow rate, the average transit time of fodder particles through the reactor is one minute.

Boiler 64, at a maximum capacity of 100 horsepower, produces 4,000 pounds per hour of 80 percent quality boiler steam, at a pressure of 330 psia at a temperature of 426° F., with a total enthalpy of 3.5 million BTU's per hour. This boiler steam converts 2,900 pounds per hour of city water to 30 percent quality secondary steam in vaporizer 66. This secondary steam leaves separator 78 (after disengagement) at 100 percent quality and at a pressure of 180 psia and a temperature of 373° F., with a total enthalpy of 3.4 million BTU's per hour, having absorbed one million BTU's per hour in heat exchanger 70 in being preheated while yet in the liquid state, and the remaining 2.4 million BTU's per hour in vaporizer 66 in being converted from water to steam.

Within reactor 10, the 12,000 pounds per hour of fodder which, assuming a 15 percent moisture content, comprises 10,200 pounds per hour of "dry" fodder and 1,800 pounds per hour of water in the form of included moisture, absorbs two million BTU's per hour of enthalpy from the 3.4 million BTU's per hour available in the processing steam. The temperature of the "dry" fodder is thereby raised to 373° F. and the temperature of its included moisture is raised to 212° F. The processing steam, in giving up the two million BTU's per hour, leaves reactor 10 at a quality level of 16 percent.

This 2,900 pound per hour flow of 16 percent quality processing steam exiting reactor 10 with still 1.4 million BTU's per hour enthalpy, converts, within heat exchanger 87, 1,000 pounds per hour of water into ejecting steam of 100 percent quality and at a pressure of 140 psia and a temperature of 353° F., with a total enthalpy of 1.2 million BTU's per hour.

There is thus a 40 psi drop (180 psia processing steam minus 140 psia ejecting steam) from pipe 11 to pipe 15 across metering valve 14 and also a 20° F. temperature drop (373° F. processing steam minus 353° F. ejecting steam). As the fodder traverses the metering valve from a higher energy region (180 psia and 373° F.) to a lower energy region (140 psia and 353° F.), enthalpy is returned to the system by the fodder and its moisture in the form of "reheat". The 10,200 pounds per hour of "dry" fodder returns 102,000 BTU's per hour and the 1,800 pounds per hour of included moisture returns 88,200 BTU's per hour, for a total return to the system of 190,200 BTU's per hour. In addition, the 1,800 pounds of included moisture delivers to the nozzle region the 583,200 BTU's per hour it absorbed in reactor 10. Thus, a total of nearly two million BTU's per hour (including the 1.2 million BTU's per hour of the ejecting steam) is delivered to, and is available at, the nozzle region. (The enthalpy of the "dry" fodder is not included in this calculation, inasmuch as it leaves the nozzle with substantially the same enthalpy it brought to the nozzle, and so neither supplies enthalpy to, nor requires enthalpy from, the nozzle region.) This two million BTU's per hour enthalpy at the nozzle region is divided among the 1,800 pounds per hour of moisture included in the fodder and the 1,000 pounds per hour of ejection steam, for a nozzle enthalpy of 700 BTU's per pound of moisture passing through the nozzle. This nozzle enthalpy is sufficient to convert the moisture passing through the nozzle into 44 percent quality steam, such being sufficient to produce a dry expanded fodder requiring no auxiliary drying.

Control 146 of the Automatic Control is preset at 180 psia, the desired reactor pressure, and control 166 is preset at 170 psia, a sufficiently lower pressure than the 180 psia setting of control 146 to assure that the first level of control will be of valve 152 controlling fuel flow to boiler 64. The automatic control, by controlling fuel flow to the boiler and injection rate, will maintain the nozzle enthalpy within the general range of 450 to 750 BTU's per pound of moisture passing through the nozzle, regardless of moisture content of the fodder being processed. The lower limit of 450 BTU's per pound is such that below this enthalpy level the expanded fodder will be too wet, and the upper level of 750 is such that above this level more enthalpy than necessary will be supplied at a waste of boiler fuel. The range is of sufficient width to compensate for uncontrolled conditions such as ambient humidity.

In the foregoing example, the pressure and temperature of the processing steam (180 psia and 373° F.) and of the ejection steam (140 psia and 353° F.) are seen to be conditions of saturated, rather than superheated steam.

It is also seen from the example that the enthalpy of the ejection steam (1.2 million BTU's) is nearly equal to that of the processing steam as it leaves the reactor (1.4 million BTU's) but that the flow of ejection steam is much less than that of the ejection steam (1000 pounds per hour compared with 2900 pounds per hour).

The amount of enthalpy delivered to the nozzle region by the ejection steam is thus nearly that which would have been delivered had the processing steam itself been used for ejection; however, the amount of moisture passing through the nozzle (in the form of ejection steam and moisture in the fodder) which must share this enthalpy is very much reduced. Thus, nozzle enthalpy (which is the number of BTU's per pound of moisture flowing through the nozzle) is greatly increased by employing the "used" processing steam only to create an additional, lesser flow of ejection steam, rather than by employing substantially the full flow of processing steam to eject the fodder material. To achieve a comparable nozzle enthalpy using the full flow of processing steam for ejecting the fodder, as commonly done in batch processors heretofore available, a much higher enthalpy processing steam would be required, at a considerably greater expenditure of boiler fuel.

It is thus seen that the preferred embodiment described herein delivers a given nozzle enthalpy at a given fodder flow rate with much less expenditure of boiler fuel than comparable batch processors heretofore available. Expressed otherwise, at a given fuel consumption and fodder flow rate, the preferred embodiment described provides a much higher nozzle enthalpy.

The variable rotational speed of the screw 12 allows the transit time of the fodder particles through the reactor to be varied over a wide range such that pre-expansion treatment of different types of fodder materials may be optimized. Varying the speed of rotation has the effect of varying the bulk density of the fodder in the reactor and thus provides for optimum processing of fodder particles having high angles of internal friction which makes them resistant to flow (e.g. grain such as corn, which has been crushed or broken before treatment). The flow characteristics of such material may be greatly improved and clogging of the apparatus thus prevented by increasing the rotational speed of the screw 12 to decrease the material's bulk density. This allows use of fodder materials which would otherwise be poorly expanded or would be wasted.

SUMMARY

A preferred embodiment has been described, and illustrated by an example of a particular application, for expanding fodder in a continuous flow, rather than a batch, process, and which automatically yields a product requiring no auxiliary drying prior to its use or storage regardless of the initial moisture content of the fodder. A recirculating steam boiler creates, from untreated city water, the steam necessary for processing and ejecting the fodder.

It is to be appreciated that there are other applications for such expanders of particulate matter, and the scope of the invention is limited only by that of the appended claims.

What is claimed is:

1. A continuous flow method of expanding particulate animal feedstuff material, having a moisture content, into puffed form, comprising the steps of:
    (a) introducing quantities of such particulate material into an enclosed confined pressurized region having an inlet and an outlet and maintaining pressure in said pressurized region whereby processing may continue while additional particulate material is added,
    (b) pressurizing and heating said particulate material in said pressurized region by contacting it with a first flow of high enthalpy steam,
    (c) separating substantially all of the first flow of steam from the material in said pressurized region, to remove the first flow of steam which has become wetter,
    (d) transporting said particulate material in a substantially continuous manner from said pressurized region past said outlet to an enclosed confined nozzle region having a restrictive opening, said nozzle region having an enthalpy, and contacting said material in the nozzle region with a second flow of steam which is dry and has not previously been exposed to said material,
    (e) ejecting said second flow of steam with said particulate material through said restrictive opening into a region of lower pressure than the pressure in said nozzle region in a manner to expand said material into puffed form, and
    (f) controlling and maintaining the enthalpy of said steam with said material as they pass through the nozzle region within a predetermined range so as to provide a desired expanded material.

2. The method of claim 1 wherein enthalpy from said first flow of steam is transferred to said second flow of steam prior to contacting the material with the second flow of steam.

3. The method of claim 2 wherein said enthalpy of said first flow of steam is transferred to said second flow of steam without intermixing said first and second flows of steam.

4. The method of claim 1 in which a closed circuit heating fluid system is used to create said first flow of steam.

5. The method of claim 4 in which said system includes a boiler for creating steam as the heating fluid.

6. The method of claim 1 in which the step of controlling the nozzle enthalpy in step (f) comprises increasing or decreasing the enthalpy of the first flow of steam employed in step (b).

7. The method of claim 1 in which the step of controlling the nozzle enthalpy in step (f) comprises increasing or decreasing the introduction rate of the particulate material into said pressurized region in step (a).

8. The method of claim 1 wherein the first flow of steam in step (b) is generated from a source of untreated water including the steps of:
 (a) connecting a steam boiler to a boiler feed water source and to one side of a heat exchanger,
 (b) connecting a source of untreated water to another side of said heat exchanger,
 (c) generating boiler steam from said boiler feed water in said steam boiler,
 (d) routing said boiler steam from said steam boiler through said heat exchanger and back to said boiler,
 (e) flowing untreated water through said heat exchanger while the boiler steam is flowing therethrough, to convert said flowing untreated water into low quality steam within said heat exchanger, and
 (f) routing said low quality steam from said heat exchanger to a separator for removing moisture from the low quality steam to create high quality steam.

9. The method of claim 8 including the step of preheating said untreated water before flowing said untreated water through said heat exchanger.

10. The method of claim 1 further comprising moving said particulate material through said pressurized region in a first direction in step (b) and wherein the contacting of said particulate material with the first flow of steam includes passing at least a portion of said first flow of steam in a direction counter to the first direction of movement of the particulate material.

* * * * *